Feb. 20, 1945.    P. SPENCE    2,370,110
SAFETY DEVICE FOR REDUCING VALVES
Filed Sept. 2, 1942
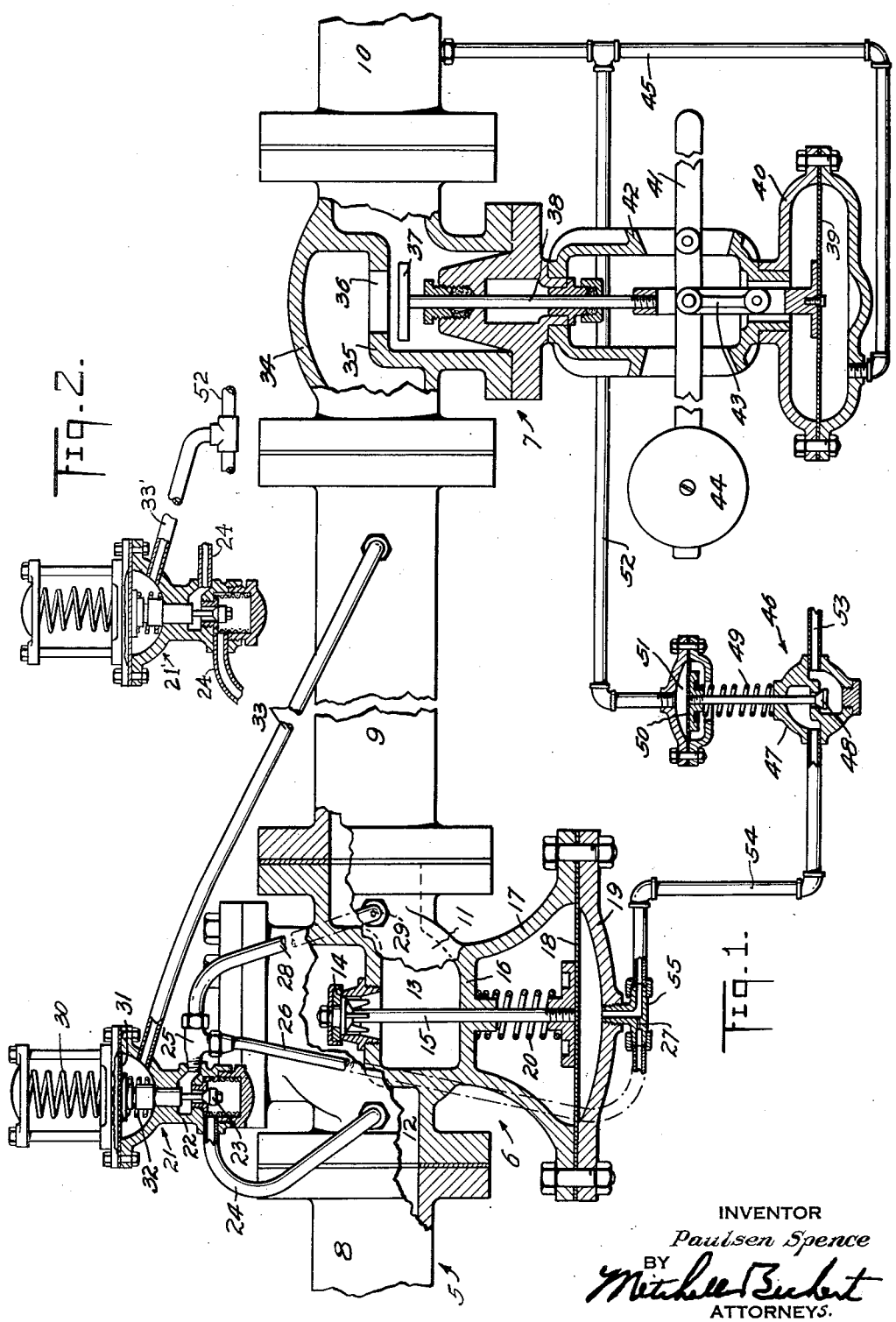
INVENTOR
Paulsen Spence
BY
Mitchell Bubert
ATTORNEYS Patented Feb. 20, 1945

2,370,110

UNITED STATES PATENT OFFICE 2,370,110

SAFETY DEVICE FOR REDUCING VALVES

Paulsen Spence, East Orange, N. J., assignor to Spence Engineering Company, Inc., Walden, N. Y., a corporation of New York Application September 2, 1942, Serial No. 457,004

10 Claims. (Cl. 50—10)

My invention relates to a safety device for reducing valves.

It is now common practice to employ a plurality of reducing valves in a pressure line to effect a multiple stage reduction when there is a very wide differential between the high pressure and the final low pressure. The low pressure equipment connected to the low pressure pipe is often such that if a pressure be admitted thereto substantially higher than the low pressure for which it is designed, serious damage may be caused. A dangerous rise in pressure in the low pressure line may be caused, for example, by rupture of a diaphragm in the low pressure reducing valve, or by a piece of scale or other foreign matter between the seat and the valve member of the low pressure reducing valve, thus preventing it from functioning properly. In fact, if for any reason the pressure in the low pressure line rises to a dangerous limit, serious damage may be caused, regardless of the reason for the higher pressure in that line.

It is the general object of my invention to provide a safety means in a multi-stage pressure reduction system to prevent an undue rise of pressure in the low pressure line.

More specifically, it is an object of the invention to provide a safety device in a multi-stage reduction system arranged to convert a high pressure reducing valve into a low pressure reducing valve upon a failure of the normal low pressure reducing valve to perform its function properly.

Other objects and various features of novelty and invention will be hereinafter pointed out or will become apparent to those skilled in the art.

Fig. 1 shows, for illustrative purposes only, a multi-stage reduction system and safety device illustrating a preferred form of the invention.

Fig. 2 illustrates a slight modification.

As illustrated, a pressure fluid line 5 is divided by a plurality (in this case two) of reducing valves 6—7 into a plurality of pressure sections, the inlet side of the line or high pressure section 8, the intermediate pressure section 9, and a low pressure section 10. The high pressure reducing valve 6 is designed to reduce the pressure in the section 8 to the intermediate pressure in the section 9. The low pressure reducing valve 7 is designed to reduce the intermediate pressure in the section 9 to the final low pressure in the section 10. I have shown merely a two-stage reduction, but it is to be understood that in proper cases there might be further reducing valves and further stages of reduction.

In the form shown, the high pressure reducing valve 6 is of the type shown in my patent, No. 1,995,949, March 26, 1935. Briefly, the valve 6 comprises a valve body 11 having a high pressure side 12 and a low pressure side 13. The valve member 14 controls the passage of fluid from the high pressure to the low pressure sides of the valve. A valve stem 15 carries the valve 14 and passes downwardly through a partition 16 into the diaphragm casing or bonnet 17, and the valve stem is acted on by a diaphragm 18 held between the diaphragm casing 17 and the cap 19. A spring 20 serves to urge the valve 14 toward closed position and the valve is urged by fluid pressure beneath the diaphragm toward open position. In the form shown, the valve is controlled by a pilot valve 21. The pilot valve includes a valve body 22 divided by a partition and pilot valve member 23 into a high pressure side and a low pressure side. A pressure pipe 24 is connected to the high pressure side of the valve 6 and enters the high pressure side of the pilot valve casing, that is, below the valve member. At the low pressure side of the pilot valve casing there is a T-connection 25, one branch of which leads through pipe 26 and a bleed connection 27 to the lower or pressure side of the diaphragm 18. The other pipe 28 leads through a bleed port 29, similar to the bleed port 27, into the low pressure side of the valve 6. The pilot valve member 23 is urged toward open position by adjustable spring means 30. The pilot valve diaphragm 31 acts in opposition to the spring 30 and when sufficient pressure is admitted beneath the diaphragm 31 the valve member 23 will be moved toward closed position, either by being secured to the diaphragm 31, or by means of a light spring 32, as will be clear. The space beneath the pilot valve diaphragm 31 is connected by means of a control pipe 33 to the outlet side of the main valve and, as shown, is connected to the line section 9, that is, the section of intermediate pressure.

Operation of the high pressure reducing valve 6 is as follows:

High pressure fluid from the high pressure section 8 enters the pilot valve through pipe 24 and with the pilot valve open the high pressure fluid passes through T-fitting 25 and through bleed passage 27 to the space beneath the main valve diaphragm 18. Pressure is thus built up on the diaphragm 18 so as to open the valve 14 and permit steam to pass into the intermediate section 9. When the pressure in section 9 attains the desired limit, the pressure through pipe 33 will be transmitted to the pilot valve diaphragm so as to close or partially close the pilot valve 23. Pressure fluid in the lines 26—28 may escape through the bleed connection 29 into the low pressure side of the valve and thus with the pilot valve 23 under the control of the pressure in the intermediate section 9, a balance of pressures will be struck so that the main valve 14 will remain in or move to such position as to maintain the desired intermediate pressure in the section 9.

The low pressure reducing valve 7 serves to reduce the pressure of pressure fluid from the intermediate section 9 to the pressure desired in the final low pressure section 10. The valve 7 includes a valve body 34 having a partition 35 and fluid passage or seat 36 controlled by a valve member 37. The valve 37 is carried by a stem 38, which passes downwardly and through a yoke is connected to or rests on a diaphragm 39 in a diaphragm chamber 40. The valve 37 is urged toward open position by suitable means, such as a lever 41 pivoted to a support or yoke 42 on the valve casing. The lever is connected to a part of the valve stem, as by means of a linkage 43, and an adjustable weight 44 serves to urge the valve 37 toward open position with the desired force. The valve 37 is urged toward closed position by the diaphragm 39. A pressure connection 45 from the low pressure section 10 leads to the diaphragm chamber 40 beneath the diaphragm 39 so that when the final low pressure in the low pressure section 10 reaches the desired degree, the pressure beneath the diaphragm 39 will close the valve or move it toward closed position so that the final low pressure desired will be maintained in the low pressure section 10, all as will be clearly understood.

It will be clear that by means of the system so far described, high pressure fluid from the high pressure section 8 will be reduced in pressure in the intermediate pressure section 9 and the intermediate pressure from the section 9 will be reduced by the valve 7 in the low pressure section 10. If for any reason the high pressure valve 6 should get out of order and pressure in the intermediate pressure section 9 should rise even to the limit of the high pressure section 8, no harm need result, for the reason that the low pressure reducing valve 7 could reduce the high pressure to about the desired limit in the section 10. However, should the low pressure reducing valve 7 get out of order, say, through rupture of the diaphragm 39, thus permitting the valve 37 to open wide, the intermediate pressure of section 9 would then be open to the section 10 with the probability of serious damage.

The principal feature of my invention is to prevent the attainment of an abnormally high pressure in the low pressure section 10 in the event that the low pressure reducing valve 7 should fail to function properly. In accordance with my invention when the pressure in the low pressure section 10 rises above a predetermined limit (still well within the limit of safety), the high pressure reducing valve at once acts to reduce its outlet pressure so as to maintain the desired low pressure in the section 10.

In the form shown, I employ a safety pilot valve 46, which when operative serves to control or at least partially control the high pressure reducing valve 6. The safety pilot valve 46 includes a valve body 47 having a partition with a fluid passage or valve seat controlled by the valve member 48, as will be clear. The valve 48 is normally held in closed position as by means of a spring 49, preferably adjustable by means not shown. The spring may act between the valve body and the underside of a diaphragm 50 connected to the stem of the valve 48. The upper side of the diaphragm is enclosed within a diaphragm chamber 51 and this chamber is connected through a pipe 52 with the low pressure section 10. The outlet side 53 of the safety pilot valve 46 may discharge to the atmosphere or to any zone of low pressure. The opposite or inlet side of the safety pilot valve 46 is connected by means of a pipe 54 to the pressure side of the diaphragm 18. This connection may conveniently be made through a T-fitting 55, which T-fitting embodies the bleed connection 27 heretofore described.

The operation of the device is as follows:

The high pressure reducing valve 6 serves to reduce the high pressure in section 8 to the intermediate pressure in section 9. The low pressure reducing valve 7 serves to reduce the intermediate pressure from section 9 to the desired low pressure in section 10. Now, if for any reason the pressure in section 10 should rise above a predetermined limit, such high pressure transmitted through pipe 52 would act on the diaphragm 50 of the safety pilot valve and urge the valve 48 to open position against the force of the spring 49. With the valve 48 open or partially open pressure fluid would be vented from the pressure side of the high pressure reducing valve diaphragm 18 and the valve 14 would move toward closed position so as to immediately reduce the pressure in the intermediate section 9 down to the safe pressure of the low pressure section 10. The safety pilot valve 48 will quickly attain a position of balance so that the high pressure reducing valve will maintain the desired low pressure in the low pressure section 10. That desired low pressure in the section 10 maintained by the high pressure reducing valve 6 will be but slightly higher (depending upon the stress or adjustment of the spring 49 of the safety pilot valve 46) than the normal low pressure maintained by the two reducing valves together.

Instead of employing a safety pilot valve 46 for venting pressure fluid from beneath the main diaphragm 18, I might insert a safety pilot 21' (as shown in Fig. 2) in the high pressure inlet line 24 to the main pilot 21 so as to limit pressure to, instead of venting pressure fluid from, the main diaphragm 18. Such a safety pilot valve 21' in the line 24 could be and is shown as, a duplicate of the pilot 21. The control pipe 33' corresponding to the pipe 33 would be connected to the line beyond the second reducing valve, say, to the pipe 52. With such a pilot valve in the line 24 set to close upon attainment of a pressure slightly higher than the normal pressure in the zone 10, the pressure at the under side of main diaphragm 18 would be limited and the main valve 6 would act to maintain the desired pressure in line 10.

I have thus provided a two-stage reduction system with means for converting the high pressure reducing valve into a combined high and low pressure reducing valve or, in other words, a single-stage reduction system. Thus should there be any failure of the low pressure reducing valve, the high pressure reducing valve will immediately assume the function of the low pressure reducing valve so as to maintain a safe limit of pressure in the low pressure section of the line.

My invention may be embodied in steam, water or other pressure line.

While the invention has been described in considerable detail and a preferred form illustrated, it is to be understood that various changes and modifications may be made within the scope of the invention as defined in the appended claims.

I claim:

1. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, and means under control of pressure slightly higher than said low pressure for changing the setting of said high pressure reducing valve to cause it to reduce fluid pressure from said high pressure to said pressure slightly higher than said low pressure.

2. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, a pair of pilot valves for controlling the operation of said high pressure reducing valve, means for connecting one of said pilot valves to said line at the zone of said intermediate pressure, and means for connecting the other of said pilot valves to said line at the zone of said low pressure, for the purpose set forth.

3. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, fluid pressure actuated means for controlling said high pressure reducing valve, a pilot valve for controlling the pressure on said fluid pressure actuated means when said pilot valve is in one position, means actuated by fluid pressure from the line in the zone of said low pressure for moving said pilot valve to said one position, and means for preventing movement of said pilot valve to said one position until the pressure in said zone of low pressure rises above a predetermined limit.

4. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, fluid pressure actuated means for actuating said high pressure reducing valve, means including fluid pressure connection means from said line at the zone of said intermediate pressure for acting on said fluid pressure actuated means to cause said high pressure reducing valve to maintain said intermediate pressure, and means including a pressure connection to said line at the zone of said low pressure for controlling the pressure on said fluid pressure actuated means to cause said high pressure reducing valve to maintain the pressure lower than said intermediate pressure.

5. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, and means controlled by the pressure in the line in the zone of said low pressure for resetting said high pressure reducing valve to cause it to maintain a pressure below said intermediate pressure and higher than said normal low pressure.

6. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, fluid pressure actuated means for moving said high pressure reducing valve in one direction, a pilot valve for normally controlling the pressure on said fluid pressure actuated means to cause said high pressure reducing valve to maintain said intermediate pressure, a safety pilot valve for varying the pressure on said fluid pressure actuated means to cause said high pressure reducing valve to maintain a substantially lower pressure, and means for controlling said safety pilot valve in accordance with the pressure in the line at the zone of said low pressure.

7. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, fluid pressure actuated means for moving the valve member of said high pressure reducing valve to open position, a pilot valve for normally controlling pressure on said fluid pressure actuated means, a normally closed safety pilot valve, a pressure connection from said fluid pressure actuated means to said safety pilot valve, and means controlled by the pressure in the line at the zone of said low pressure for moving said safety pilot valve member to open position.

8. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, a fluid pressure actuated means for moving the valve member of said high pressure reducing valve in one direction, a pair of pilot valves for controlling the pressure on said fluid pressure actuated means, means for actuating one of said pilot valves in accordance with said intermediate pressure, means for actuating the other of said valves by the fluid pressure in said line at the zone of said low pressure, and means for setting said last mentioned pilot valve for actuation at a pressure slightly higher than the normal low pressure in said line.

9. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, fluid pressure actuated means for moving the valve member of said high pressure reducing valve toward open position, a safety pilot valve for venting pressure from said fluid pressure actuated means to cause said valve member of said high pressure reducing valve to move toward closed position, fluid pressure actuated means in pressure connection with the line at the zone of said low pressure for moving said safety pilot valve toward open position, and means for holding said safety pilot valve in closed position until the pressure in the line at the zone of said low pressure rises above a predetermined limit.

10. In a system of the character indicated, a fluid pressure line, a high pressure reducing valve in the line for reducing fluid pressure from a high pressure to an intermediate lower pressure, a low pressure reducing valve in the line for reducing fluid pressure from said intermediate pressure to a low pressure, fluid pressure actuated means for moving the valve member of said high pressure reducing valve toward open position, a pilot valve for controlling the pressure on said fluid pressure actuated means, a pressure connection from said pilot valve to said line at the zone of said intermediate pressure to cause said high pressure reducing valve to maintain said intermediate pressure, a normally closed safety pilot valve for venting pressure fluid from said fluid pressure actuated means to cause said high pressure reducing valve to maintain a lower outlet pressure, a pressure connection to said safety pilot valve from said line at the zone of said low pressure, whereby fluid pressure from said zone of low pressure may actuate said safety pilot valve to open the latter, and means for setting said safety pilot valve to maintain the same closed until the pressure in the line at the zone of said low pressure rises to a point between said low and said intermediate pressures.

PAULSEN SPENCE.